(12) United States Patent
Gao et al.

(10) Patent No.: US 8,842,881 B2
(45) Date of Patent: Sep. 23, 2014

(54) REAL-TIME VIDEO TRACKING SYSTEM

(75) Inventors: Dashan Gao, Rexford, NY (US); Ting Yu, Albany, NY (US); Li Guan, Clifton Park, NY (US); Yi Yao, Rexford, NY (US); Kedar Anil Patwardhan, Latham, NY (US); Peter Henry Tu, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 13/456,399

(22) Filed: Apr. 26, 2012

(65) Prior Publication Data

US 2013/0287248 A1    Oct. 31, 2013

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS 7,465,924 B1 *    12/2008    Klann et al. ................. 250/336.1

OTHER PUBLICATIONS

Bandstra, Mark S., et al. "The machine vision radiation detection system." Nuclear Science Symposium and Medical Imaging Conference (NSS/MIC), 2011 IEEE. IEEE, 2011.*

Opelt, Andreas, Axel Pinz, and Andrew Zisserman. "Fusing shape and appearance information for object category detection." (2006).*
Arulampalam, M. S. et al., "A Tutorial on Particle Filters for Online Nonlinear/Nongaussian Bayesian Tracking.", IEEE Trans. on Signal Processing, 50(2): 174188, Feb. 2002. 4.
Doretto, G. et al., "Region Moments: Fast Invariant Descriptors for Detecting Small Image Structures.", In CVPR, pp. 3019-3026, San Francisco, CA, Jun. 2010. 3.
Du, Y. F. et al., "Evaluation of a Compton Scattering Camera Using 3d Position Sensitive CdZnTe Detectors.", Nuclear Instruments and Methods, 457:203-211, 2001. 1, 2.
Elgammal, A. et al., "Background and Foreground Modeling Using Nonparametric Kernel Density Estimation for Visual Surveillance.", Proceedings of the IEEE, 90(7): 1151-1163, 2002. 3.
Fleuret, F. et al., "Mutli-Camera People Tracking with Probabilistic Occupancy Map.", IEEE Trans. on Pattern Analysis and Machine Intelligence, 30(2):267-282, Feb. 2008. 4.
Franco, J. S. et al., "Fusion Silhouette Cues Using a Space Occupancy Grid." in !CCV, vol. 2, pp. 1747-1753, Beijing, China , Oct. 2005. 4.
Guan, L. et al., Muti-View Occlusion Reasoning Forprobablistic Silhouette-Based Dynamic Scene Reconstruction., International Journal of Computer Vision, 90:283-303, 2010. 4.
Jaworski, J. M. et al., "Model-Based Reconstruction of Spectral and Spatial Source Distribution Form Objects with Known Motion.", In IEEE Nuclear Science Symposium Conference, 2010. 2.
Koller, D. et al., "Model-Based Object Tracking in Monocular Image Sequences of Road Traffic Scenes.", Int. J. Comput. Vision, 10:257-281, Jun. 1993. 4.

(Continued)

*Primary Examiner* — Stephen R Koziol
*Assistant Examiner* — Raphael Schwartz
(74) *Attorney, Agent, or Firm* — Jean K. Testa; Fletcher Yoder, P.C.

(57) ABSTRACT

A method for detecting and tracking a target includes detecting the target using a plurality of feature cues, fusing the plurality of feature cues to form a set of target hypotheses, tracking the target based on the set of target hypotheses and a scene context analysis, and updating the tracking of the target based on a target motion model.

17 Claims, 13 Drawing Sheets

(56) References Cited

OTHER PUBLICATIONS

Krahnstoever, N. et al., "Mult-View Detection and Tracking of Travelers and Luggage in Mass Transit Environments.", In In Proc. Ninth IEEE International Workshop on Pe 1 jormace Evaluation of Tracking and Surveillance (PETS), 2006. 3.

Laumond, J.-P. et al., "A Motion Planner for Nonholonomic Mobile Robots.", IEEE Trans. on Robotics and Automation, 10(5): 577-593, Oct. 1994. 4.

Lehner, C. et al., "4pi Compton Imaging Using a 3-d-Position-Sensitive Cdznte Detector via Weighted Listmode Maximum Likelihood.", IEEE Trans. on Nuclear Science, 51(4):1618-1624, 2004. 1, 2.

Matei, B. C. et al., "Vehicle Tracking Across Nonoverlapping Cameras Using Joint Kinematic and Appearance Features.", In CVPR, pp. 3465-3472, Colorado Springs, CO, Jun. 2011. 1.

Ottlik, A. et al., "Intilization of Model-Based Vehicle Tracking Video Sequences of Inner-City Intersections.", International Journal of Computer Vision, 80:211-225, 2008. 10.1007/s11263-007-0112-6. 1.

Perea, A. et al., "Evaluation of Algorithms for Tracking Multiple Objects in Video.", In Applied Imagery and Pattern Recognition Workshop (AIPR), p. 35, Oct. 2006. 5.

Rios-Cabrera, R. et al., "Efficent Multi-Camera Detection, Tracking, and Identification Using a Shared Set of Haar-Feature.", In CVPR, pp. 65-71, Colorado Springs, CO, Jun. 2011. 1.

Stauffer, C.., "Estimating Tracking Sources and Sinks." In IEEE Conf. on Computer Vision and Pattern Recognition Workshop, vol. 4, p. 35, Jun. 2003. 3.

Zhu, L. et al., "Part and Appearance Sharing: Recursive Compositional Models for Multi-View.", In CVPR, pp. 1919-1926, San Francisco, CA, Jun. 2010. 4.

* cited by examiner

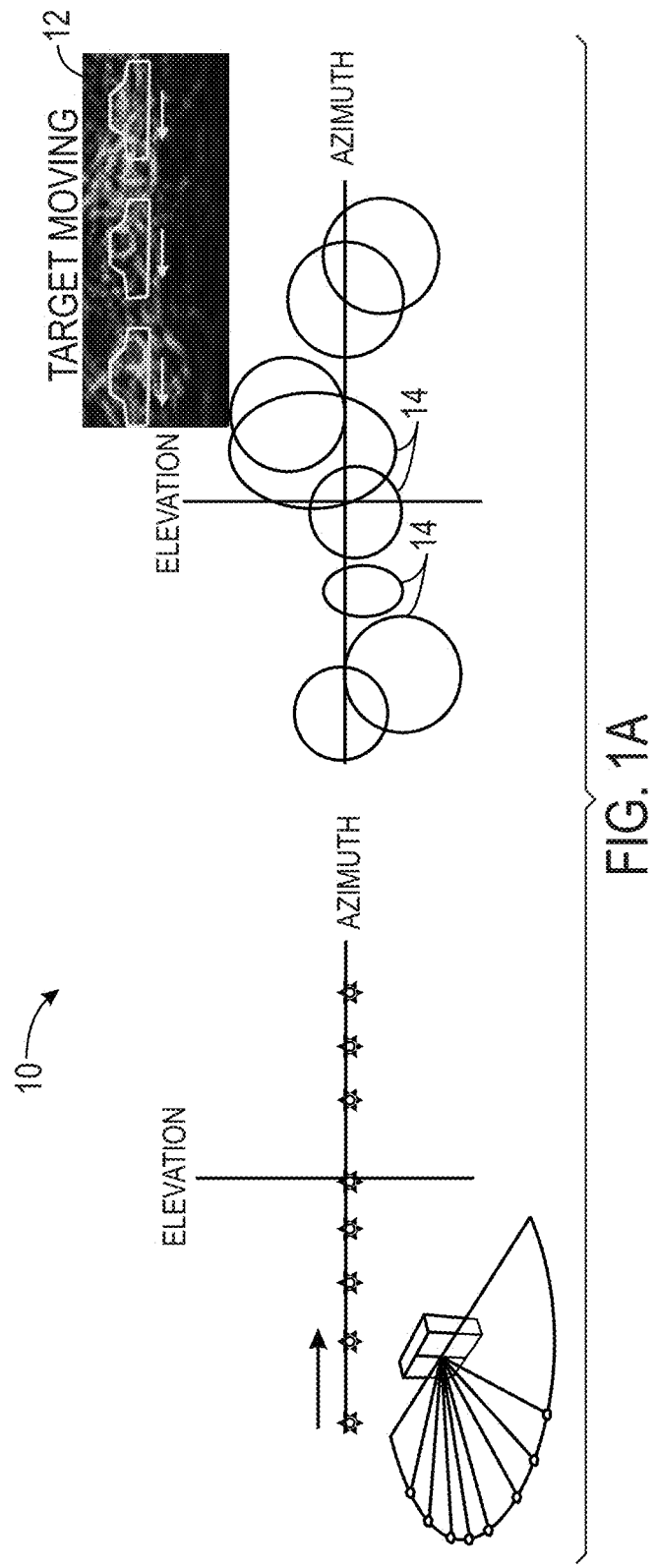

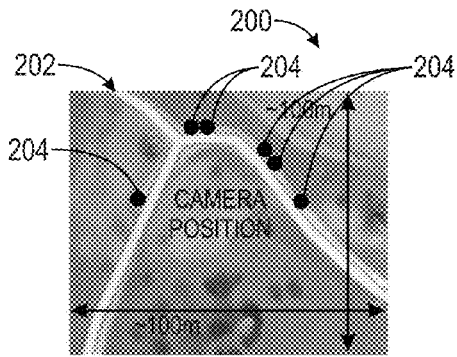
FIG. 8A
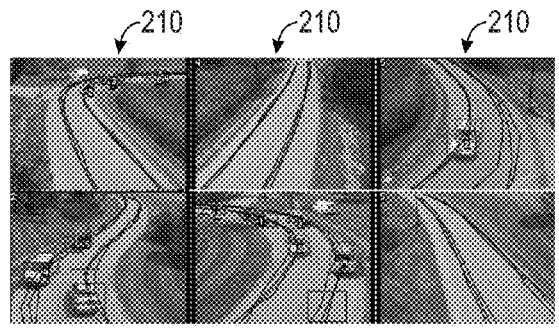
FIG. 8B
| DRIVING PROGRAM | DRIVING SPEED (mph) | 5 | X | | | X | X | | | X | | | | | | |
|---|---|---|---|---|---|---|---|---|---|---|---|---|---|---|---|---|
| | | 10 | | X | | | | X | | | X | | | | | |
| | | 15 | | | X | | | | X | | | X | | | X | X |
| | | 20 | | | | X | | | | X | | | X | | | |
| | # LANES | ONE-WAY | X | X | X | X | X | X | X | X | | | | | X | |
| | | TWO-WAY | | | | | | | | | X | X | X | X | | X |
| SINGLE VEHICLE | | | X | X | X | X | X | | | | | | | | | |
| MULTI-VEHICLE (6) | | | | | | | | X | X | X | X | X | X | X | X | X |
| # OF SEQUENCES | | | 40 | 40 | 40 | 40 | 25 | 20 | 20 | 20 | 10 | 10 | 10 | 10 | 10 | 20 | 10 |
FIG. 9

| SPEED | PRECISION | | RECALL | | COMPLETENESS | | FRAGMENTATION | |
|---|---|---|---|---|---|---|---|---|
| | BASE LINE | TEST | BASE LINE | TEST | BASE LINE | TEST | BASE LINE | TEST |
| MULTI-CAR DOUBLE-LANE | | | | | | | | |
| 5mph | 0.52 | 0.80 | 0.64 | 0.87 | 0.84 | 0.92 | 1.18 | 1.03 |
| 10mph | 0.65 | 0.92 | 0.73 | 0.89 | 0.86 | 0.91 | 1.15 | 1.04 |
| 15mph | 0.68 | 0.91 | 0.71 | 0.85 | 0.85 | 0.90 | 1.11 | 1.02 |
| 20mph | 0.89 | 0.95 | 0.90 | 0.90 | 0.88 | 0.91 | 1.05 | 1.02 |
| MULTI-CAR SINGLE-LANE | | | | | | | | |
| 5mph | 0.54 | 0.74 | 0.61 | 0.80 | 0.82 | 0.90 | 1.16 | 1.05 |
| 10mph | 0.65 | 0.78 | 0.74 | 0.82 | 0.83 | 0.91 | 1.07 | 1.03 |
| 15mph | 0.73 | 0.86 | 0.81 | 0.82 | 0.86 | 0.90 | 1.05 | 1.03 |
| 20mph | 0.82 | 0.92 | 0.82 | 0.78 | 0.86 | 0.93 | 1.07 | 1.00 |
| SINGLE-CAR | | | | | | | | |
| 5mph | 0.95 | 1.00 | 0.95 | 1.00 | 0.92 | 0.93 | 1.03 | 1.00 |
| 10mph | 0.96 | 0.97 | 0.98 | 1.00 | 0.93 | 0.93 | 1.03 | 1.00 |
| 15mph | 0.82 | 0.84 | 0.96 | 0.96 | 0.92 | 0.92 | 1.00 | 1.01 |
| 20mph | 1.00 | 0.97 | 1.00 | 0.97 | 0.94 | 0.92 | 1.00 | 1.00 |

FIG. 10

REAL-TIME VIDEO TRACKING SYSTEM

STATEMENT REGARDING FEDERALLY SPONSORED RESEARCH & DEVELOPMENT

This invention was made with Government support under contract number HSHQDC-08-C-00137. The Government has certain rights in the invention.

BACKGROUND

Detecting radiation threats, e.g., to protect urban cities and identify terrorists at international borders, is important for national security. Recent developments in CZT-based Compton radiation imaging have enabled the determination of an angular direction of a stationary radioactive source. However, the underlying Compton imaging principles may be unable to detect moving radioactive sources.

BRIEF DESCRIPTION

In a first embodiment, a method for detecting and tracking a target includes detecting the target using a plurality of feature cues, fusing the plurality of feature cues to form a set of target hypotheses, tracking the target based on the set of target hypotheses and a scene context analysis, and updating the tracking of the target based on a vehicle motion model.

In another embodiment, a method includes detecting a target with a first plurality of detectors, wherein the first plurality of detectors comprises a first appearance-based detector and a first silhouette-based detector, and detecting the target with a second plurality of detectors, wherein the second plurality of detectors comprises a first appearance-based detector and a second silhouette-based detector. The method further includes generating a first plurality of feature cues with the first plurality of detectors, generating a second plurality of feature cues with the second plurality of detectors, fusing the first plurality of feature cues and the second plurality of feature cues to create a set of target hypotheses, tracking the target based on the set of target hypotheses and a scene context analysis, and updating the tracking of the target based on a motion model.

In another embodiment, a method for detecting and tracking a target includes detecting the target with a plurality of detectors when the target enters an environment through an entry region, wherein the plurality of detectors are configured to generate a plurality of feature cues, wherein at least two of the feature cues are of different types, fusing the plurality of feature cues to generate a set of target hypotheses, tracking the target based on the set of target hypotheses and a scene context analysis of the environment, terminating tracking of the target when target exits the environment through an exit region.

DRAWINGS

These and other features, aspects, and advantages of the present invention will become better understood when the following detailed description is read with reference to the accompanying drawings in which like characters represent like parts throughout the drawings, wherein:

FIG. 1A is a diagram illustrating a video tracking output without motion compensation;

FIG. 8A is an aerial view of the test site, illustrating road geometry and camera locations of the test site;

FIG. 8B is a set of sample frames collected from camera views of the test site shown in FIG. 8A;

FIG. 9 is a table including a summary of video sequences experimentally conducted using the test site shown in FIG. 8A;

FIG. 10 is a table including various scenarios tested in the disclosed experiments;

DETAILED DESCRIPTION

Figure 1B:
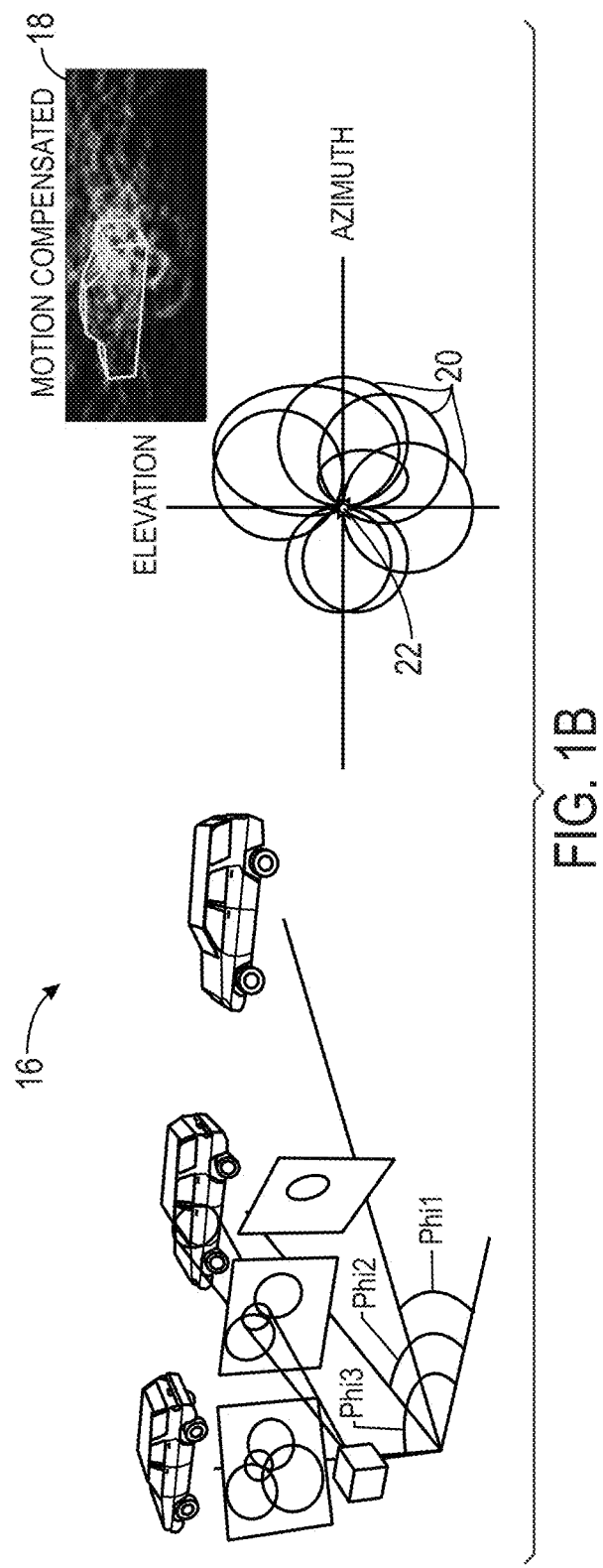
FIG. 1B is a diagram illustrating a video tracking output with motion compensation.

Embodiments of the present disclosure include systems and methods for detection of moving radioactive sources using the Compton imaging system with video-based target tracking. In particular, a video tracking system provides radiation detectors with a three-dimensional location of a target in real-time so that motion of the target can be compensated for during the imaging process. After motion compensation, the target appears to be stationary with respect to detectors, and as a result, the moving radioactive source can be detected without modifying the detectors. In one embodiment, a real-time radiation detection system, e.g., an outdoor vehicle detection system, may include of multiple cameras and radiation detectors. This process may be referred to as target linked radiation imaging (TLRI). For example, FIGS. 1A and 1B illustrate the effect of motion compensation in the video tracking of a gamma ray source. More specifically, FIG. 1A shows a video tracking output 10 without motion compensation. The video tracking output 10 includes a radiation image 12 that is blurred and indistinguishable from background radiation. In other words, gamma events 14 are scattered within the radiation image 12. Conversely, FIG. 1B shows a video tracking output 16 that includes motion compensation. As shown, the video tracking output 16 includes a radiation image 18 where gamma events 20 accumulate coherently and form a salient hot spot at an image center 22 that can be easily detected.

Tracking multiple objects robustly across multiple cameras in an outdoor environment has been a classic topic in computer vision. Some typical challenges include occlusion among objects, changes in illumination, changes in weather conditions, trajectory intersection, and so forth. While many algorithms have been proposed on this topic, many the challenges still remain, especially for real-time applications (e.g., ≥10 frames per second). To address one or more of the above challenges, the disclosed tracking system combines information from multiple features and camera views to ensure that consistent target identities are maintained under challenging tracking conditions.

To evaluate the disclosed system, multiple videos and radiation sequences were collected and analyzed for various conditions. The experimental results below suggest that both the video tracking and the integrated radiation detection system discussed below perform accurately and persistently for a variety of cases, including applications with multiple vehicles, different driving speeds, and various driving patterns.

Target Linked Radiation Imaging

Figure 2A:
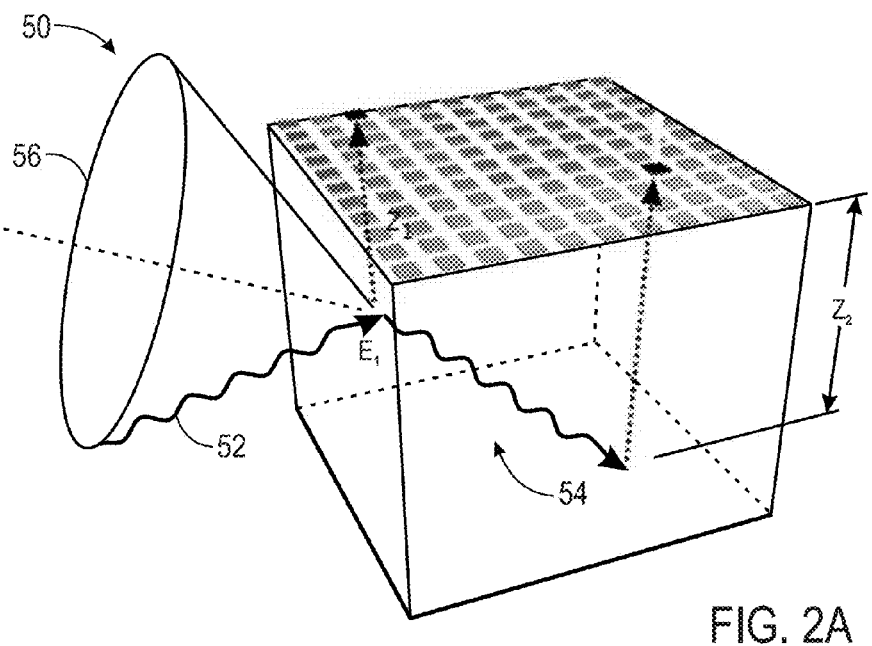
FIG. 2A is a diagram illustrating the principle of Compton scattering radiation imaging.
Figure 2B:
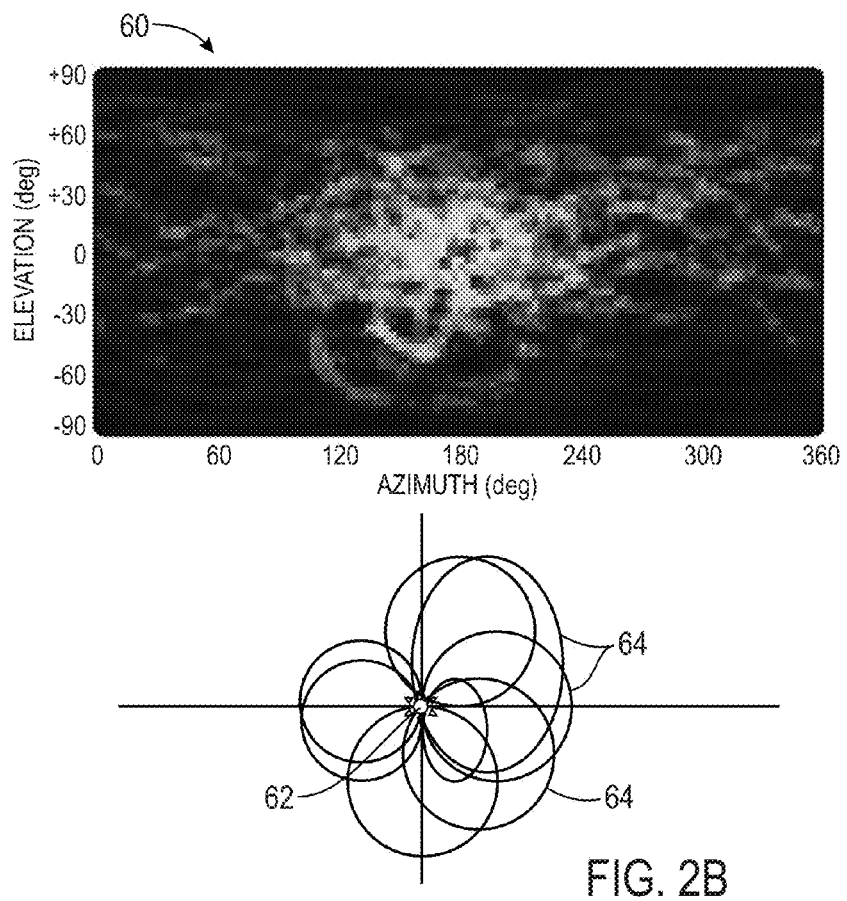
FIG. 2B is a 2D radiation image generated during a Compton imaging process.

A CZT-based Compton camera is a radiation detector configured to detect both the energy spectrum and the direction of gamma rays emitted by radioactive materials. Specifically, a CZT-based Compton camera measures the partial energy depositions that occur when gamma rays undergo inelastic Compton scatter within the detector. The scatter angle and the energy deposition of the gamma ray are related by the Compton equation:

$$\cos(\theta) = 1 - \frac{m_e c^2 E_1}{E_0^2 - E_0 E_1} \quad (1)$$

where $E_1$ and $E_2$ represent the energy deposited in the detector, $E_0(E_0=E_1+E_2)$ is the original gamma ray energy, and $\theta$ is the scatter angle. $m_e$ and c are constants. From the positions and energies of the interactions in the detector, the incident direction of the gamma ray can be determined to lie on a cone of half angle $\theta$ in 3D space. For example, FIG. 2A illustrates the principle of Compton scattering radiation imaging. Specifically, FIG. 2A includes a cone 50 (e.g., a 3D cone) which includes a gamma ray 52 that deposits energies $E_1$ and $E_2$ in a detector 54. As shown, the cone 50 can be represented by a circle 56 in a 2D radiation image whose x and y axes represent azimuth (horizontal, 360°) and elevation (vertical, 180°) angles, respectively. When multiple gamma rays 52 are combined, the events from a stationary source pile up coherently in the direction of the source. As a result, circles 56 intersect with each other at the same location, forming a radiation hot spot. For example, FIG. 2B is a 2D radiation image 60 generated during a Compton imaging process. Specifically, the radiation image 60 has a radiation hot spot 62 formed by intersecting circles 64. As will be appreciated, the radiation hot spot 62 may indicate the existence or presence of a radioactive source. By measuring the size, intensity, and location of the radiation hot spot 62, the radioactive source and its spatial direction may be identified.

However, when the radioactive source is moving, the gamma ray cones 50 from the source may no longer overlap with each other because each of the cones 50 may be detected from a different direction. As a result, the radiation image 60 becomes blurry and indistinguishable from background radiation, as shown in FIG. 1A. However, if the position of the source at the instance when each gamma ray 52 is detected can be predicted, the position of the cone 50 can then be adjusted to compensate for the motion of the source. As discussed above with reference to FIG. 1B, after motion compensation, the gamma events may once again accumulate coherently and form a salient hot spot which can be detected.

There are a variety of technologies available for target tracking. For example, radar or LIDAR systems are often used in military and some civilian applications. Additionally, a video based approach may be used because it can be adapted to a wide variety of scenarios. Further, video based methods may have relatively low costs and complexities. Moreover, the video based system can utilize many existing surveillance cameras. Therefore, the disclosed embodiments include computer vision based (e.g., video based) target tracking algorithms to estimate target locations for motion compensation in the Compton imaging process.

Figure 3:
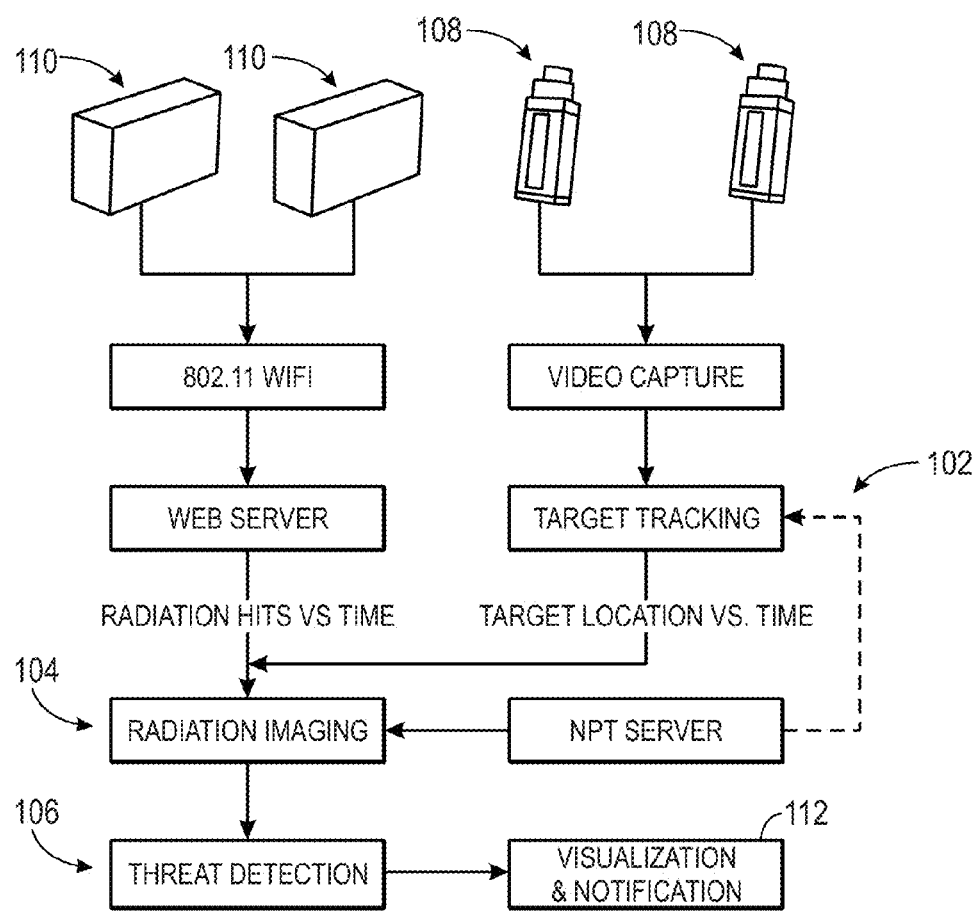
FIG. 3 is a flow chart of an embodiment of a target linked radiation imaging system for detecting, locating, and identifying moving radioactive sources in real-time and in an outdoor environment.

FIG. 3 is a flow chart of an embodiment of a target linked radiation imaging system 100 for detecting, locating, and identifying moving radioactive sources in real-time and in an outdoor environment, in accordance with aspects of the present disclosure. The system 100 includes three subsystems: a real-time video tracking system 102, a radiation imaging system 104, and a threat detection system 106. The video tracking system 102 takes in raw video streams from multiple cameras 108, detects targets of interest (e.g. vehicles), and estimates the trajectory of the targets. The estimated target trajectories are then passed to the radiation imaging system 104. The radiation imaging system 104 also receives gamma events collected by the CZT-based Compton detectors 110. The trajectory and the gamma events are synchronously time-stamped so that target motion can be compensated consistently during the imaging process. Furthermore, if multiple targets are present, a radiation spectrum and image are generated for each target. At the threat detection stage, if a hot spot (e.g., hot spot 62) is detected in the radiation image (e.g., radiation image 60), the threat detection system 106 identifies its corresponding isotope by analyzing the spectrum. Finally, alarms and visual notifications 112 are displayed. For example, the alarms or visual notifications 112 may be displayed or superimposed on the top of a video stream of the cameras 108.

Multi-Cue, Multi-View Tracking

Figure 4:
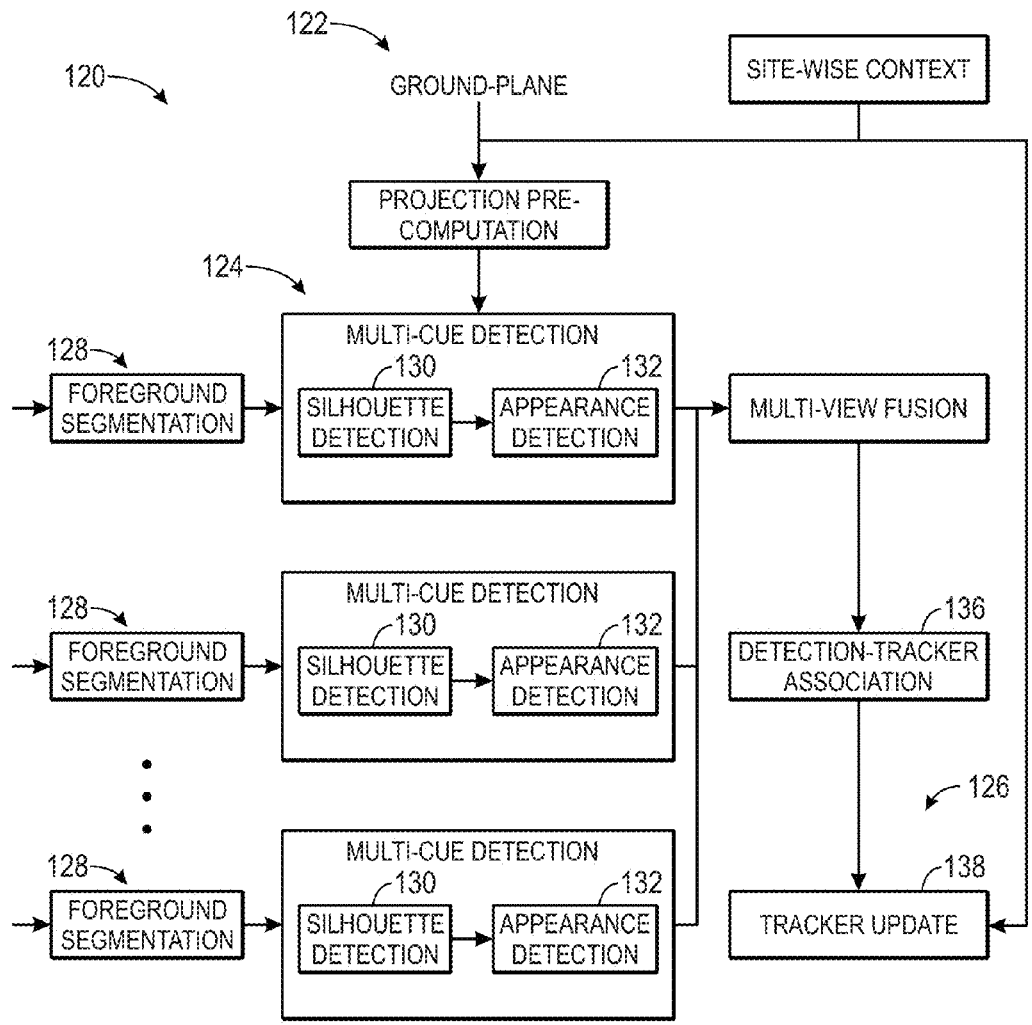
FIG. 4 is a flow chart of an embodiment of a video tracking system, in accordance with aspects of the present disclosure.

FIG. 4 is a flow chart of an embodiment of a video tracking system 120 (e.g., video tracking system 102 of FIG. 3), which may be used in accordance with aspects the present disclosure. Several important approaches have been taken to address the real-time requirement and outdoor challenges. For example, in certain embodiments of the video tracking system 120, camera intrinsic and extrinsic parameters may be calibrated and/or fixed. Additionally, target motion may be restricted to a ground plane 122, along which motion of people and vehicles generally occurs. These specifications enable 2D projections of a 3D target on an image plane to be pre-computed and stored for any ground-plane location. In this manner, run-time computation can be significantly reduced.

The system 120 follows a "detection-and-tracking" paradigm, which includes two stages: a detection stage 124 that proposes a set of vehicle hypotheses and a tracking stage 126 that associates the hypotheses with vehicle trackers and updates each trajectory. In each stage, multiple feature cues, such as foreground silhouettes, scene and object geometry, and appearance, are jointly considered to improve robustness.

In the detection stage 124, a non-parametric density estimation-based background model is updated for each pixel, and the foreground regions are segmented, as indicated by reference numeral 128. The segmented regions are then passed to a silhouette-based vehicle detector 130, which compares the segmented regions with image projections of a 3D vehicle model to produce a set of vehicle hypotheses. The vehicle hypotheses are further evaluated by an image-based vehicle detector 132 that uses covariance features. Because both evaluation scores provide valuable information from different perspectives, a score fusion step follows in the search for the best hypotheses, as discussed in further detail below. Once vehicle detection is carried out in each individual view, the possibly conflicting hypotheses from all views are combined in a multi-view detection fusion stage 134 to produce a set of consistent detections.

The tracking stage 126 is performed in two steps: detection-tracker association 136 and tracker updating 138. Detection-tracker association 136 assigns vehicle detections to system trackers by considering both geometric distance and appearance similarity, which may be described via color signatures. Additionally, to accommodate specific constraints of vehicle motion, tracker updating 138 may adopt a "single track" motion model and a particle filter-based tracking algorithm, as discussed below.

To reduce the number of pre-computed projections, scene context information may be explored. For example, in certain embodiments, only the projections inside the area of interest (e.g., the road) may be computed. In addition, to take the advantage of scene context for vehicle tracking, it may be assumed that there are sources and/or sinks of a scene. In other words, the sources and sinks of a scene may be locations where vehicle trackers can be initialized or terminated, respectively. This constraint may significantly improve tracking robustness, thereby reducing to false and missed detections.

The scene context information may be in the form of a scene context model. For example, the scene context model may describe the boundary of a site and the key static objects inside of the scene (e.g., trees and buildings for an outdoor environment or tables and doors for an indoor environment). The scene context model may include a set of polygons depicting the boundary of the site with one or more entry and/or exit regions. The scene context model may further include a set of three dimensional wireframe models depicting the scene objects.

Furthermore, a scene object within the scene context model can be used to improve the robustness of both target detection and tracking. In target detection, for example, scene objects may allow the inference of whether a target is partially occluded by scene objects. If a target is occluded by a scene object, only parts of the target being detected can provide a large confidence of the presence of the target. Furthermore, during target tracking, scene objects can allow the inference of whether a target temporarily goes behind a scene object. If a target does temporarily travel behind a scene object, tracking can be sustained and/or paused for the target, and then tracking may be resumed once the target re-appears from behind the scene object.

As mentioned above, the disclosed embodiments may include two types of vehicle detectors: silhouette-based detectors 130 and appearance-based detectors 132. The silhouette-based detector 130 compares each segmented foreground region with the pre-computed projections of 3D vehicles. Additionally, silhouette-based detectors produce a detection score by measuring the ratio between the areas of the foreground and the projected vehicle regions. The detection score varies from zero to one, where a higher value indicates a higher probability of a vehicle presence. The appearance-based detector 132 computes a vector of covariance features from an image patch extracted at each candidate region and compares it with a previously trained vehicle appearance model (e.g. a classifier). To ensure a comparable detection score with the silhouette-based detector 130, a classification posterior may be adopted as the output score of the appearance-based detector 132.

Figure 5:
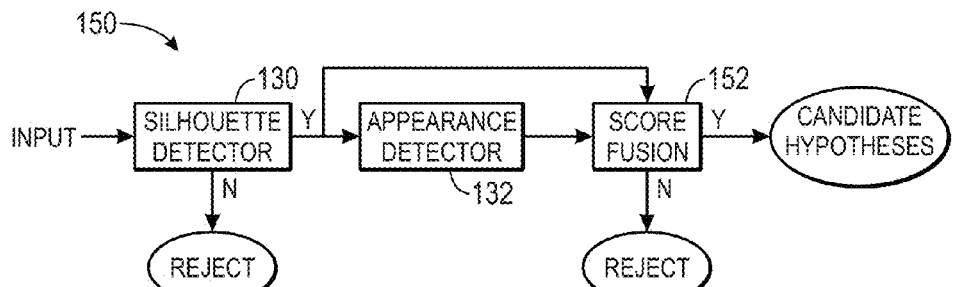
FIG. 5 is a flow chart of a modified cascaded structure, where an appearance-based detector operates on the output of a silhouette-based detector with the final decision drawn by a score fusion block.

Considering both detection robustness and computational complexity, the two detectors (e.g., the silhouette-based detector 130 and the appearance-based detector 132) may be combined through a modified cascaded structure. For example, FIG. 5 illustrates a flow chart of a modified cascaded structure 150, where the appearance-based detector 132 operates on the output of the silhouette-based detector 130 with the final decision drawn by a score fusion block 152. The adopted structure 150 has a computational complexity comparable to that of a standard cascade, but it may be more flexible in fusing detection scores. In certain embodiments, the product may be computed as the final score for generating candidate hypotheses.

Figure 6:
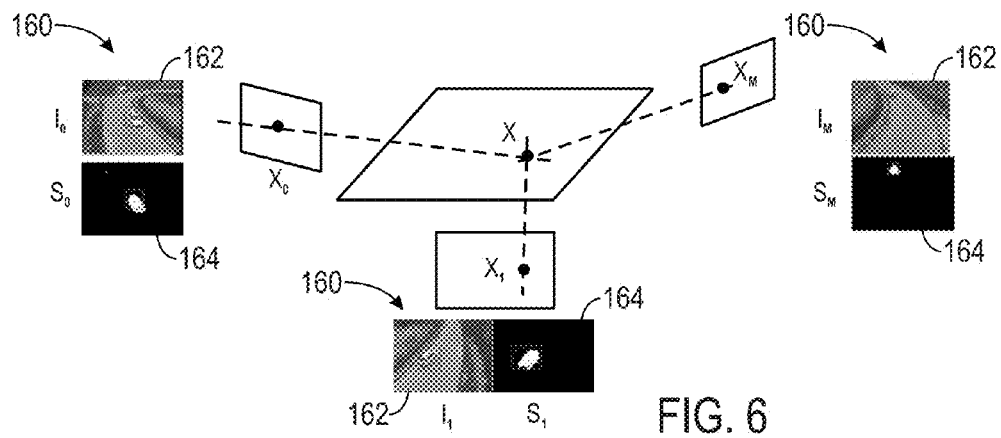
FIG. 6 is an illustration of detection fusion from multiple views.

Referring back to FIG. 4, while all camera views use the ground plane 122 as their common reference, vehicle detections, independently obtained from each view, can be inconsistent due to detection and calibration errors. Consequently, directly using the ensemble of the detections for tracking may create false tracks. Therefore, it may be important to fuse the detections into one consensus set. For example, a goal of the multi-view detection fusion may be to estimate a consistent binary occupancy map $g_x \in \{0,1\}$, where $g_x=1$ indicates a target at the location X. In certain embodiments, a Bayesian fusion framework may be used, which computes the posterior of:

$$P(G_x=1|S,I) \sim P(G_x=1)\Pi_{i=1}^{M} P(S_i|G_x=1)P(I_i|S_i) \qquad (2)$$

where $I_i, i \in \{1, \ldots, M\}$ are the M images, and $S_i$ denotes binary variables of the detection in each image i, whose probability is provided by multi-cue detection. For example, FIG. 6 is an illustration of detection fusion from multiple views 160. As shown, each view 160 has an appearance-based image 162 (e.g., an output from the appearance-based detector 132) and a silhouette-based image 164 (e.g., an output from the silhouette-based detector 130), which are fused. The output of the Bayesian fusion is a probability map of the ground plane 122, every pixel of which indicates the posterior probability of $G_x=1$ at that location, given the observed detections from different views. Furthermore, a mean-shift algorithm may be applied to the posterior occupancy map to find the peaks of the probabilities as the final set of vehicle detection results.

Once a detection is associated with an existing tracker, the trajectory of the tracker is updated based on a motion model. Various motion models have been used in existing methods for vehicle tracking, such as constant velocity and circular motion. However, certain embodiments of the present disclosure may include a more realistic vehicle motion model. For example, as mentioned above, a "single track" model may be used.

Figure 7:
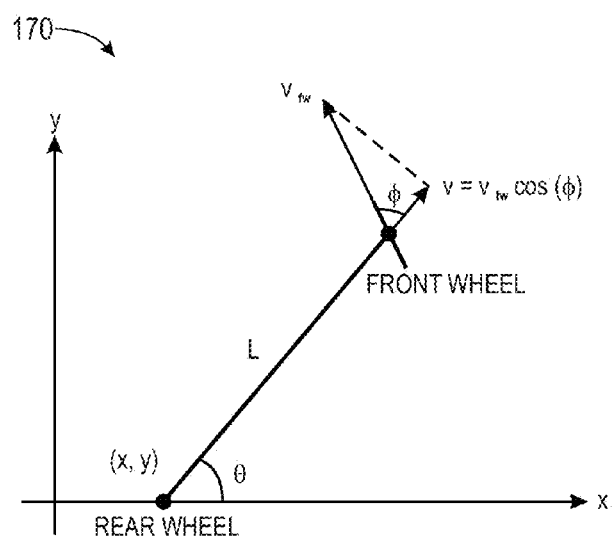
FIG. 7 is a graph illustrating a single track model that may be used for updating the trajectory of a target or vehicle.

FIG. 7 is a graph 170 which illustrates a single track model that may be used for updating the trajectory of a target or vehicle. As shown by the graph 170, the single track model assumes that a vehicle cannot slide sideways, e.g., $\dot{y} \cos\theta - \dot{x} \sin\theta = 0$. Additionally, the single track model assumes that the curvature of a vehicle path is constrained by the upper-bound of the front wheel angle, e.g., $\emptyset \leq \emptyset max$. Letting L denote the distance between the front and rear axles of a vehicle and v be the tangent speed of the vehicle, the kinematics of the single track model can be translated into the following differential equations:

$$\dot{x} = v\cos(\theta) \quad (3)$$

$$\dot{y} = v\sin(\theta) \quad (4)$$

$$\dot{\theta} = \frac{v}{L}\tan(\phi) \quad (5)$$

$$\dot{v} = a \quad (6)$$

$$\dot{\phi} = b \quad (7)$$

For simplicity, constant tangent velocity and wheel angle may be assumed (i.e., a=b=0). Given the above motion model, vehicle tracking can be defined as a nonlinear Bayesian tracking problem with state variable X=(x, y, θ, v, Ø). In certain embodiments of the single track model, a particle-filter-based tracking algorithm may be used to solve the above nonlinear tracking problem.

Experiments and Results

To evaluate the overall radiation detection system (e.g., imaging system 100 and tracking system 120) as well as the vehicle tracking system 120 individually, a test site consisting of six fixed cameras (e.g., cameras 108) and three CZT-based radiation detectors (e.g., detectors 110) covering an area of approximately 100×100 square meters was created for experimentation. FIG. 8A is an aerial view 200 of the test site, illustrating road geometry 202 and camera locations 204 of the test site. Additionally, FIG. 8B illustrates sample frames 210 collected from camera views of the test site. Data collection involved running one or more vehicles through the test site, with one vehicle carrying a 10 mCi Cs-137 source. While the vehicles were run through the test site, the multiple cameras (e.g., cameras 108) and CZT-detectors (e.g., detectors 110) simultaneously recorded videos and radiation signals, respectively. Each sequence was collected with different combinations of traffic density (e.g., between one and six vehicles), driving speed (e.g., 5, 10, 15, or 20 mph), driving pattern (e.g., one-way traffic vs. two-way traffic), vehicle arrangements (e.g., different colors, models, and orders of vehicles), and weather conditions (e.g., sunny, cloudy, or rainy). Multiple sequences (e.g., from 10-40) were collected for each scenario in order to achieve representative statistics. FIG. 9 illustrates a table 220 which includes a summary of the video sequences conducted from the test site. To conduct performance evaluation, ground-truth vehicle locations in all sequences were annotated by specifying vehicle locations in key frames (e.g., frames 210 shown in FIG. 8B) and applying a bi-linear interpolation for remaining frames.

Since vehicle tracking plays an important role in the overall radiation imaging system (e.g., imaging system 100 and tracking system 120), the performance of the tracking system 120 was evaluated first. As the first step, system generated vehicle trajectories ("system tracks") were matched to ground-truth tracks by measuring their temporal overlap and spatial proximity.

For the experiments described below, $T_g$ is the time span between the start and the end of a ground-truth track, and $T_s$ is the time span between the start and the end of a system track. For the ith ground-truth track and the ith system track, their temporal overlap ratio is given by $$C_t^{i,j} = \frac{|T_g^i \cap T_s^j|}{|T_g^i|}.$$

Additionally, their spatial proximity at the t th time instance is defined as a function of the distance between the ground-truth location $X_{g,i,t}$ and the system track location $$X_{s,j,t}: C_s^{i,j,t} = \Phi(\|x_{s,j,t} - x_{g,i,t}\|),$$

where $$\Phi(x) = \begin{cases} \left(1 - \frac{x}{x_{max}}\right)^2 & x \leq x_{max} \\ 0 & x > x_{max} \end{cases} \quad (8)$$

and $x_{max}$ is a threshold for the maximum distance allowed in matching. For the experiments discussed herein, the maximum distance allowed in matching was set to 2 meters. The overall spatial proximity is then given by:

$$C_s^{i,j} = \frac{\sum_{t \in T_g^i \cap T_s^j} C_s^{i,j,t}}{|T_g^i \cap T_s^j|} \quad (9)$$

The final matching score is a weighted sum of the temporal coverage ratio and the spatial proximity $$C_{i,j} = \omega C_t^{i,j} + (1 - \omega) C_s^{i,j},$$

with ω=0.3 in the present experiments.

To match system tracks with ground-truth tracks, a search begins by selecting the pair with the highest matching score, i.e. $\{i^*, j^*\} = \arg\max C_{i,j}$. Thereafter, $C_{i,j}$ is updated with i=j* by removing the matched frames. $C_{i,j}$ for j=j* is also set to 0 to enforce the constraint that each system track can only be matched to, at most, one ground-truth track. This selection and updating process iterates until all the remaining matching scores are below a threshold. Given the set of matched ground-truth and system track pairs, the following metrics are used to quantitatively evaluate the performance of video tracking.

At the trajectory level, the tracking accuracy is evaluated using precision and recall. In particular, the system tracks that are matched to any ground-truth tracks are counted as true positives (TP), and the unmatched ground-truth and system tracks are counted as false negatives (FN) and false positives (FP), respectively. The system's precision and recall are then defined as: precision=TP/(TP+FP) and recall=TP/(TP+FN).

To evaluate the performance of the tracking system (e.g., video tracking system 120) in a finer scale, the temporal overlap between matched system and ground-truth track pairs was evaluated. Additionally, metrics of completeness and fragmentation were used. For example, completeness may be defined as the average temporal overlap between a ground-truth and its matched system tracks:

$$\text{completeness} = \frac{1}{TP}\sum_{i}\frac{\sum_{j\in\mathcal{T}_i}|T_g^i \cap T_s^j|}{T_g^i}$$

where $T_i$ includes all system tracks that are assigned to the ith ground-truth track. Fragmentation, on the other hand, measures the average number of system tracks matched to the same ground-truth track:

$$\text{fragmentation} = \frac{1}{TP}\sum_{i}|\mathcal{T}_i|$$

Ideally, both completeness and fragmentation should be equal to one.

Figures 11A, 11B:
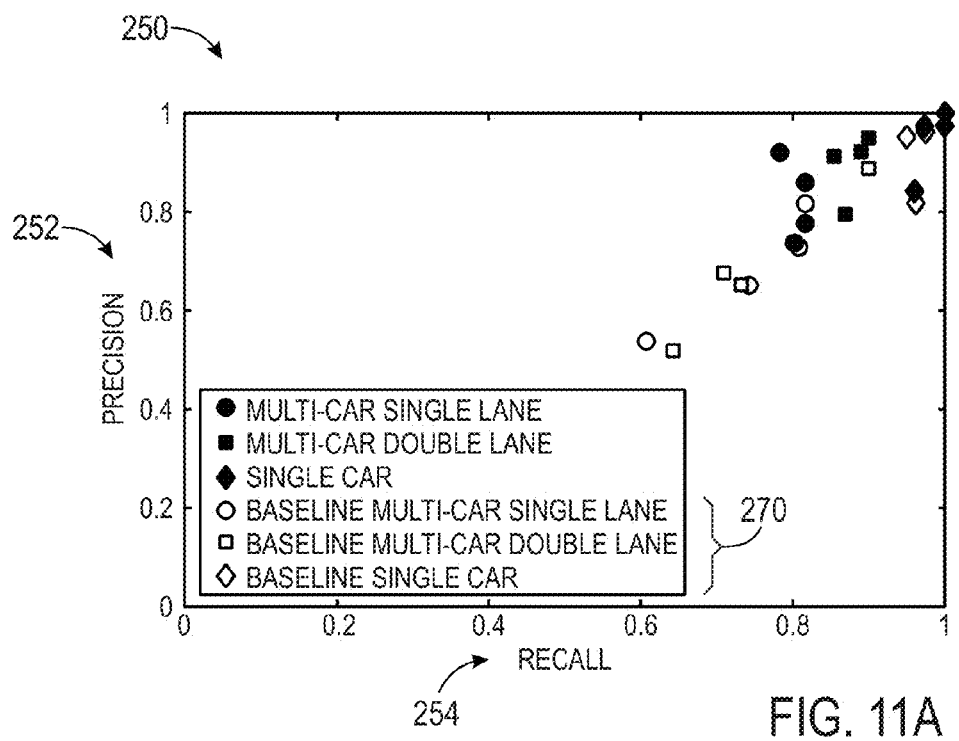
FIG. 11A is a plot depicting the results of the disclosed experiments in terms of precision versus recall.
FIG. 11B is a plot depicting the results of the disclosed experiments in terms of completeness versus fragmentation.

The above metrics were computed for various testing scenarios. Specifically, FIG. 10 is a table 240 which lists various scenarios tested in the present experiments. FIGS. 11A and 11B also summarize the results into a first plot 250 and a second plot 260, respectively. The first plot 250 depicts the results of the present experiments in terms of precision 252 versus recall 254. The second plot 260 depicts the experimental results in terms of completeness 262 versus fragmentation 264. For comparison, the performance of a baseline system (e.g., points 270 in both first and second plots 250 and 260) were included. The baseline system performance used a straightforward cascaded fusion of silhouette and appearance cues and a direct ensemble of the vehicle detections from multiple camera views without fusion.

As indicated in FIGS. 10-11B, better performance is achieved for simple scenarios with one vehicle compared to scenarios with multiple vehicles. For example, at a speed of 5 mph, the precision/recall deteriorates from 1.00/1.00 for the single-car scenario to 0.80/0.87 for the multi-car double-lane scenario. Second, with respect to the influence of driving speed, the presently disclosed tracking system (e.g., systems 100, 120) appeared to perform equally well for single-car scenarios. However, for multi-car scenarios, the system (e.g., systems 100, 120) performance degrades as the moving speed decreases, especially from 10 mph to 5 mph. This may be because when vehicles move at a lower speed, they tend to follow each other closer, which imposes additional challenges, such as occlusion, to vehicle tracking. For speeds beyond 10 mph, the separation between vehicles is sufficient for the system (e.g., systems 100, 120) to maintain consistent target identities. Third, in contrast to the variations observed in precision and recall, completeness and fragmentation are relatively stable for all scenarios. For example, for the multi-car double-lane scenarios, completeness and fragmentation are 0.91 and 1.02 respectively at 20 mph, while at 5 mph, similar completeness/fragmentation values (0.92/1.03) are achieved. This suggests that all true positive tracks are of good quality. Finally, the disclosed system (e.g., systems 100, 120) not only outperformed the baseline system in most of the scenarios, but also showed improved robustness for difficult scenarios, such as multiple cars moving at low speeds. This further suggests that the multi-cue and multi-view fusion methods disclosed herein (e.g., structure 150) increase the robustness of tracking. In other words, embodiments of the disclosed tracking systems (e.g., systems 100, 120) may be capable of accurately locating moving targets in various challenging traffic scenarios.

Figure 12:
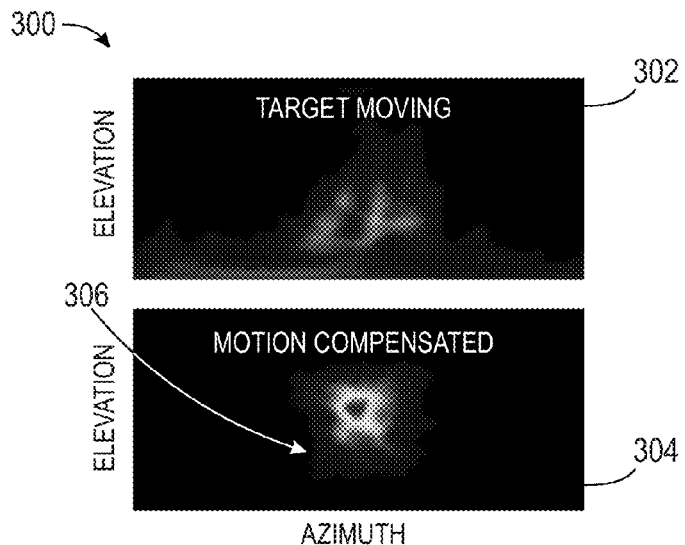
FIG. 12 is a comparison of two Compton images generated with and without motion compensation for a vehicle carrying a 10 mCi radioactive Cs-137 source and moving at 15 mph.

FIG. 12 illustrates a comparison of two Compton images 300 generated with and without motion compensation for a vehicle carrying a 10 mCi radioactive Cs-137 source and moving at 15 mph. Specifically, a first image 302 is a Compton image without motion compensation and a second image 304 is a Compton image with motion compensation. As shown, the second image 304 (i.e., the motion-compensated image) shows a salient hot spot 306 in the center indicating the existence of a radioactive source. Conversely, the first image 302 (e.g., the non-motion-compensation image) appears blurred, and no source can be identified. This comparison confirms the benefit provided by the video tracking system 120.

To quantitatively evaluate the accuracy of the radiation detection system (e.g., system 100), the system's resolving power was measured, which is defined as the accuracy of successfully distinguishing a source-carrying (SC) vehicle from a non-source-carrying (NSC) vehicle, given a certain separation between them. As previously mentioned, identifying an SC vehicle is based on the hot spot detection in the Compton radiation image. Ideally, the radiation image of an SC vehicle exhibits a hot spot at the center, while that of an NSC vehicle could have either a smeared or no hot spot or a hot spot deviating from the image center (depending on its distance to the SC vehicle). In the present experiments, if a hot spot is detected (e.g., with a peak amplitude larger than a pre-defined threshold) and the distance between the hot spot and the radiation image center is smaller than a threshold, a vehicle is identified as an SC vehicle. Otherwise, it is identified as an NSC vehicle. To quantify the system resolving power, Receiver Operating Characteristic (ROC) curves and the corresponding equal-error rates (EER) were computed for different vehicle separations.

Figure 13A:
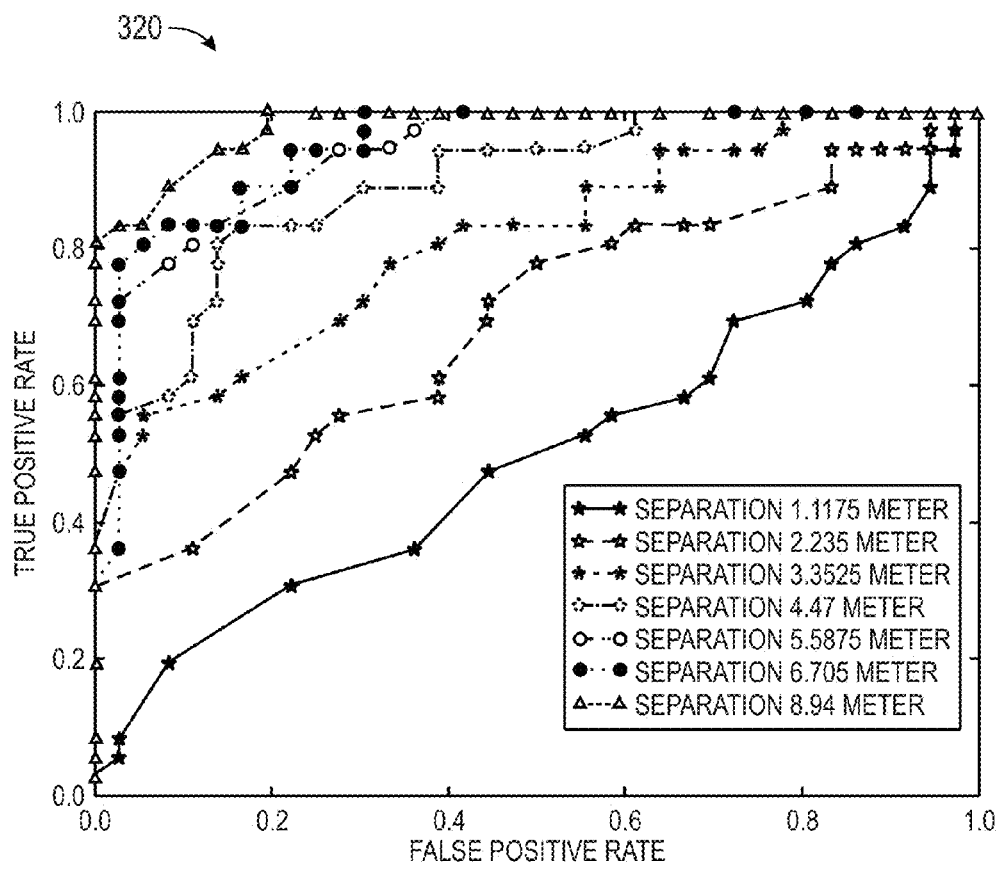
FIG. 13A is a graph showing Receiver Operating Characteristic (ROC) curves for a vehicle carrying a radioactive source moving at 5 mph, in accordance with the disclosed experiments.
Figure 13B:
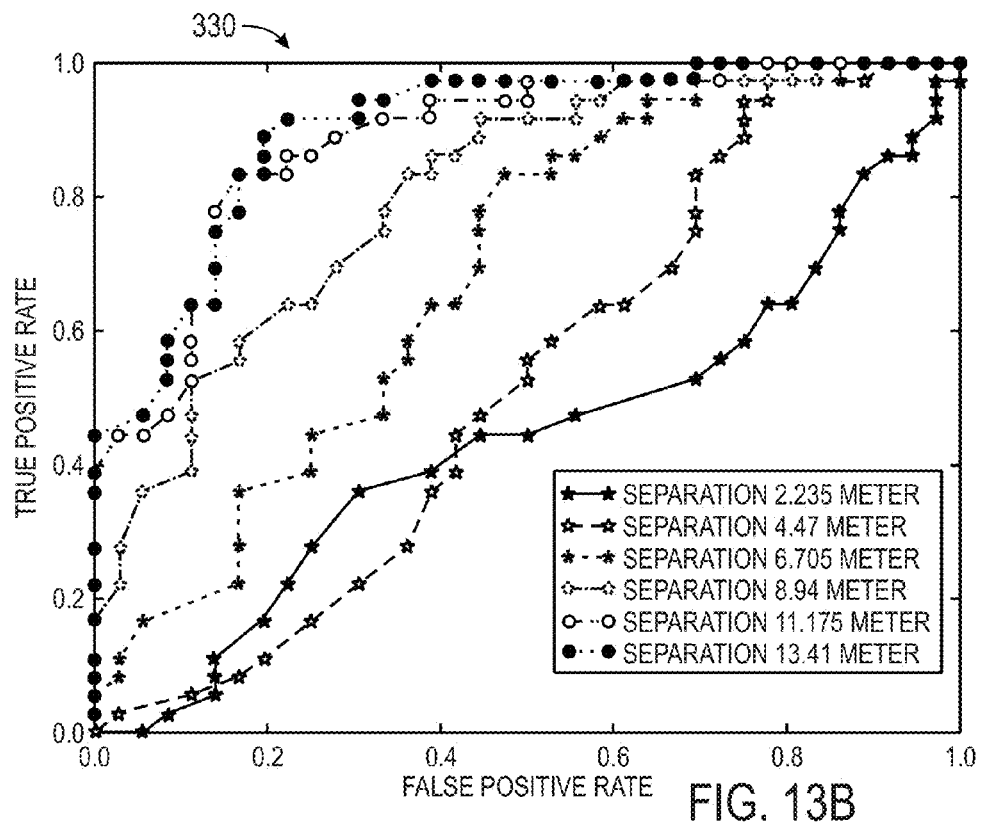
FIG. 13B is a graph showing ROC curves for a vehicle carrying a radioactive source and moving at 10 mph, in accordance with the disclosed experiments.
Figure 13C:
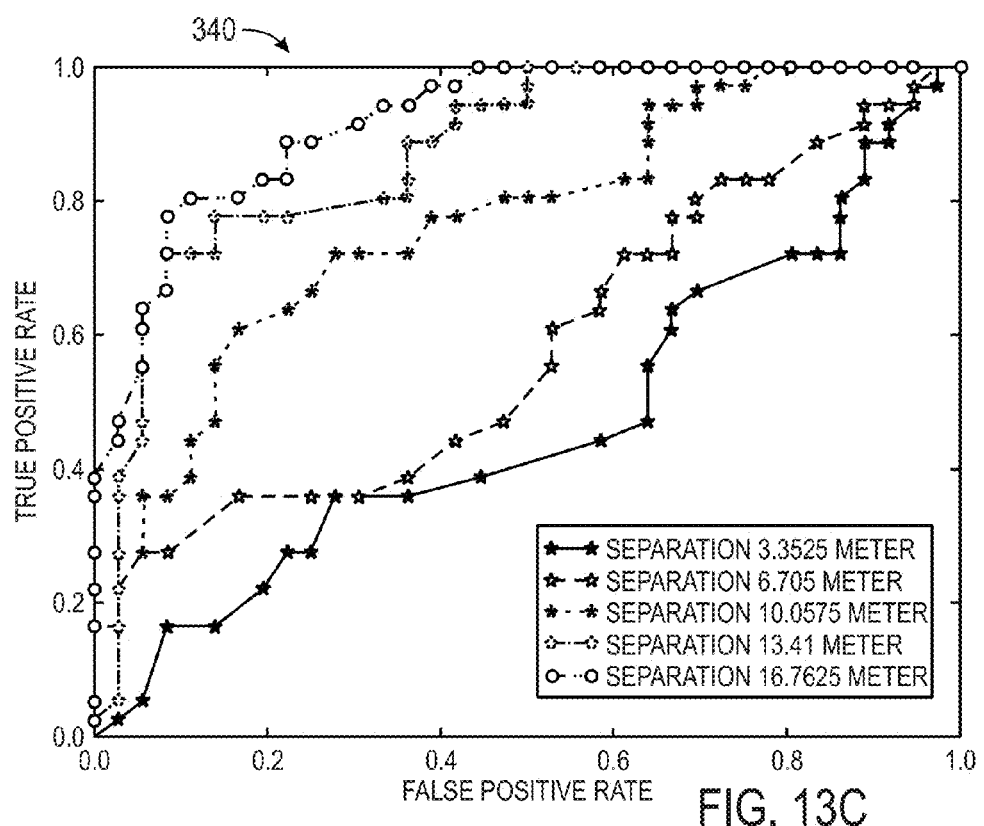
FIG. 13C is a graph showing ROC curves for a vehicle carrying a radioactive source and moving at 15 mph, in accordance with the disclosed experiments.
Figure 13D:
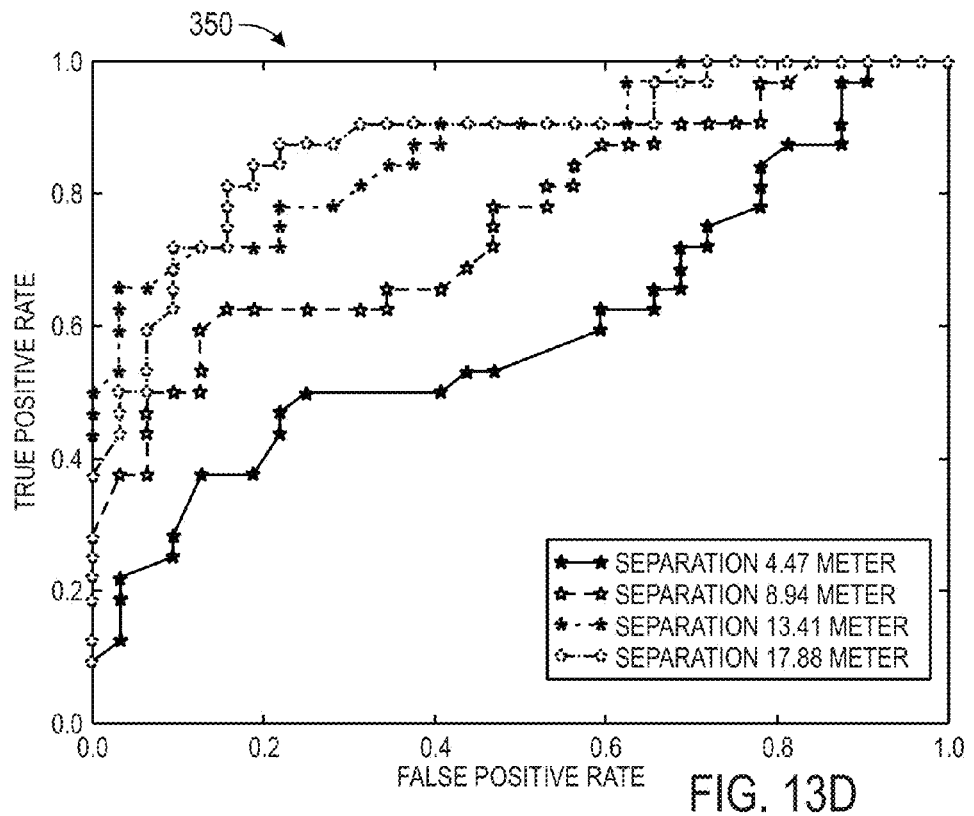
FIG. 13D is a graph showing ROC curves for a vehicle carrying a radioactive source and moving at 20 mph, in accordance with the disclosed experiments.
Figure 14:
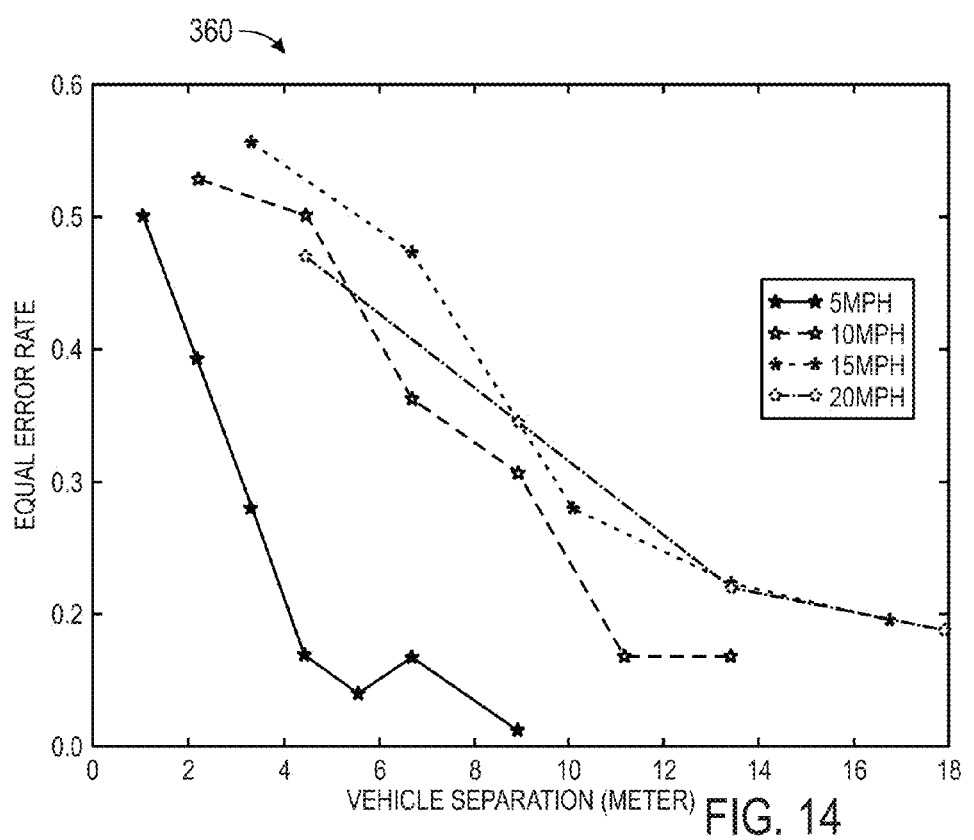
FIG. 14 is a graph illustrating the corresponding equal-error rates (ERR) as a function of vehicle separation for a vehicle carrying a 10 mCi Cs-137 source moving at different speeds.

FIGS. 13A-13D depict the ROC curves for a vehicle carrying a 10 mCi Cs-137 source and moving at four different speeds. Additionally, FIG. 14 depicts the corresponding EER for identifying a vehicle carrying a 10 mCi Cs-137 source and moving at the four different speeds. Specifically, FIG. 13A is a graph 320 showing ROC curves for a vehicle moving at 5 mph, FIG. 13B is a graph 330 showing ROC curves for a vehicle moving at 10 mph, FIG. 13C is a graph 340 showing ROC curves for a vehicle moving at 15 mph, and FIG. 13D is a graph 350 showing ROC curves for a vehicle moving at 20 mph. Additionally, FIG. 14 is a graph 360 showing EER as a function of vehicle separation for identifying a vehicle carrying a 10 mCi Cs-137 source and moving at different speeds. For each speed, the ROC curves are categorized by quantizing the distance between an SC vehicle and the NSC vehicles. As indicated by the graphs 320, 330, 340, 350, and 360, increasing the separation between vehicles leads to better ROC curves and lower EER, and thus, better resolving power. As will be appreciated, larger separation may shift the hot spot farther away from the image center, thereby leading to less confusion between SC and NSC vehicles.

Moreover, the graph 360 of FIG. 14 suggests that the system's resolving power decreases as vehicle speed increases. The reduction is particularly significant between 5 mph and 10 mph, while relatively stable between higher speeds such as 15 mph and 20 mph. The time duration that a vehicle needs to pass the radiation detectors (e.g., detectors 110) reduces at higher speeds, resulting in fewer gamma ray events received by the detectors. Consequently, the uncertainty of the hot spot confinement increases, causing more errors. Due to the reduced system resolving power at a higher speed, a larger vehicle separation may be needed to maintain a comparable performance.

Figure 15:
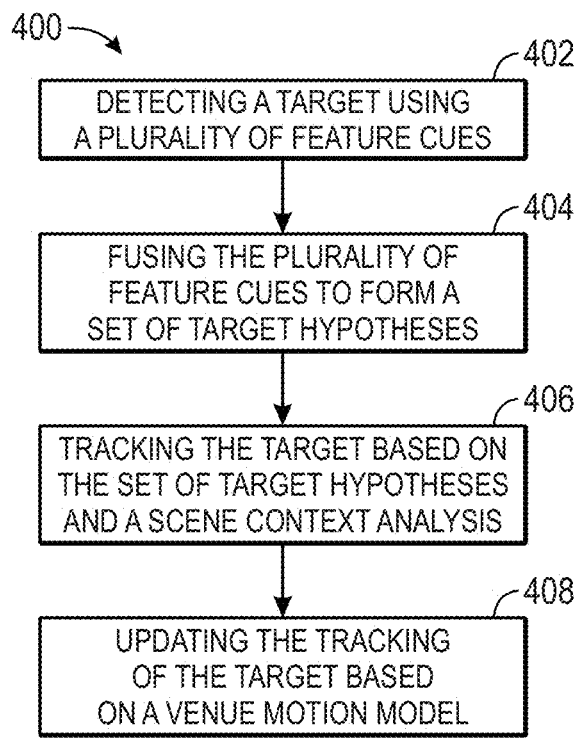
FIG. 15 is a method for detecting and tracking a radioactive target in real-time, in accordance with embodiments of the present disclosure.

FIG. 15 is a method 400 for detecting and tracking a radioactive target in real-time. The first step in the method 400 is detecting a target using a plurality of feature cues, as represented by block 402. As discussed in detail above, the feature cues may be of different types. For example, the feature cues may be indicative of a silhouette, geometry, appearance, etc. of the target. As such, the feature cues may be identified by one or more different types of detectors, such as the cameras 108 or the CZT-based Compton detectors 110. Additionally, the detectors may identify the feature cues from different angles. In other words, there may be multiple detectors disposed in various locations to identify the feature cues.

After the multiple feature cues are indentified, the plurality of feature cues may be fused to form a set of target hypotheses, as indicated by block 404 of the method 400. For example, the feature cue of a first detector (e.g., an image-based detector) and the feature cue of a second detector (e.g., a silhouette-based detector) may be combined using a modified cascaded structure (e.g., structure 150) to form the set of target hypotheses. Additionally, while the first and second detectors may generate different types of feature cues, the first and second detectors may also have similar views of the target. In certain embodiments, a set of target hypotheses may be generated for each view of the target. Thereafter, the target is tracked based on the set of target hypotheses and a scene context analysis, as represented by block 404. For example, the set of target hypotheses for different views may be fused using a Bayesian framework, as described in detail above. In this manner, a consistent set of detections of the target may be generated.

Furthermore, as indicated by block 406, a scene context analysis may be performed during tracking of the target. In certain embodiments, the scene context analysis may use a set of polygons (e.g., a scene model) which represent a site being monitored (e.g., a site where the target may exist). Additionally, the site being monitored may include entry and exit regions where the target may enter or leave the site. The entry/exit regions of the scene model may be used to initialize and/or terminate tracking of the target. For example, when a target is detected in an entry region of the scene model, tracking of the target may begin. Similarly, when a target is detected in an exit region of the scene model, tracking of the target may terminate. When tracking is initialized, tracking may be updated when proper detections are assigned. If proper detections are not assigned, the tracking of the target may be put on hold. For example, during occlusion (e.g., a vehicle traveling behind a building), the target may not be detected, and the tracking may be put on hold. However, when a new detection is obtained and can be matched to a target that is on hold, the on hold tracking will be updated and the previously missed target will be tracked again.

As indicated by block 408 of the method 400, tracking of the target may be updated based on a vehicle motion model. For example, as discussed above, a single track vehicle motion model may be used to update tracking of the target. In other words, the vehicle tracking can be defined as a nonlinear Bayesian tracking problem that may be solved using a particle-filter-based tracking algorithm.

The invention claimed is:

1. A method for detecting and tracking a target, comprising:
   detecting the target using a plurality of feature cues;
   fusing the plurality of feature cues to form a set of target hypotheses;
   tracking the target based on the set of target hypotheses and a scene context analysis; and
   updating the tracking of the target based on a target motion model;
   wherein the plurality of feature cues is generated by at least a first detector of a first type and a second detector of a second type, wherein the first and second types are different;
   wherein the first detector is a appearance-based detector and the second detector is a silhouette-based detector; and
   wherein the tracking is used to compensate for a motion of a radiation source tracked by a radiation imaging device.

2. The method of claim 1, wherein the first detector and the second detector have substantially the same view of the target.

3. The method of claim 1, wherein fusing the plurality of feature cues to form a set of target hypotheses comprises fusing a first output from a first detector with a second output from a second detector, wherein the first and second outputs are of different types.

4. The method of claim 3, wherein the first detector is an appearance-based detector and the second detector is a silhouette-based detector, and the first detector operates on the output of the second detector.

5. The method of claim 1, wherein the plurality of feature cues is generated by at least a first plurality of detectors, wherein a first view of the target for each detector of the first plurality of detectors is substantially the same, and a second plurality of detectors, wherein a second view of the target for each detector of the second plurality of detectors is substantially the same, wherein the first and second views are different.

6. The method of claim 5, wherein fusing the plurality of feature cues to form a set of target hypotheses comprises fusing a first output of the first plurality of detectors with a second output of the second plurality of detectors.

7. The method of claim 1, wherein the scene context analysis comprises monitoring a set of polygons representative of an environment where the target may exist and monitoring at least one scene object within the environment.

8. The method of claim 7, wherein the set of polygons comprises an entry region where the target may enter the environment or an exit region where the target may exit the environment.

9. The method of claim 1, wherein tracking the target based on the set of target hypotheses and the scene context analysis comprises initializing tracking, holding tracking, resuming tracking, or terminating tracking of the target based on the scene context analysis.

10. The method of claim 1, wherein updating the tracking of the target based on the target motion model comprises defining a nonlinear Bayesian tracking problem and solving the nonlinear Bayesian tracking problem with a particle-filter-based tracking algorithm.

11. A method, comprising:
    detecting a target with a first plurality of detectors, wherein the first plurality of detectors comprises a first appearance-based detector and a first silhouette-based detector;
    detecting the target with a second plurality of detectors, wherein the second plurality of detectors comprises a first appearance-based detector and a second silhouette-based detector;
    generating a first plurality of feature cues with the first plurality of detectors;
    generating a second plurality of feature cues with the second plurality of detectors;

fusing the first plurality of feature cues and the second plurality of feature cues to create a set of target hypotheses;

tracking the target based on the set of target hypotheses and a scene context analysis; and updating the tracking of the target based on a motion model;

wherein the tracking is used to compensate for a motion of a radiation source tracked by a radiation imaging device.

12. The method of claim 11, wherein fusing the first plurality of feature cues and the second plurality of feature cues to create a set of target hypotheses comprises fusing the first plurality of features cues with one another to create a first plurality of target hypotheses, fusing the second plurality of feature cues with one another to create a second plurality of target hypotheses, and fusing the first and second target hypotheses to create the set of target of hypotheses.

13. The method of claim 11, wherein the first and second appearance-based detectors are video cameras and the first and second silhouette-based detectors are video cameras.

14. The method of claim 11, wherein the first plurality of detectors has a first view of the target and the second plurality of detectors has a second view of the target, wherein the first and second views are different.

15. The method of claim 11, wherein the scene context analysis comprises monitoring a set of polygons representative of an environment where the target may exist.

16. A method for detecting and tracking a target, comprising:

detecting the target with a plurality of detectors when the target enters an environment through an entry region, wherein the plurality of detectors is configured to generate a plurality of feature cues, wherein at least two of the feature cues are of different types;

fusing the plurality of feature cues to generate a set of target hypotheses;

tracking the target based on the set of target hypotheses and a scene context analysis of the environment; and terminating tracking of the target when target exits the environment through an exit region;

wherein the plurality of detectors comprises a first appearance-based detector, a second appearance-based detector, a first silhouette-based detector, and a second silhouette-based detector, wherein the first appearance-based detector and the first silhouette-based detector substantially have a first view of the target, and the second appearance-based detector and the second silhouette-based detector substantially have a second view of the target, wherein the first and second views are different; and wherein the tracking is used to compensate for a motion of a radiation source tracked by a radiation imaging device.

17. The method of claim 16, wherein fusing the plurality of feature cues to generate a set of target hypotheses comprises fusing a first plurality of feature cues generated by the first appearance-based detector and the first silhouette-based detector to create a first target hypothesis, fusing a second plurality of feature cues generated by the second appearance-based detector and the second silhouette-based detector to generate a second target hypothesis, and fusing the first and second target hypotheses to create the set of target hypotheses.

* * * * *